United States Patent [19]
Guarino et al.

[11] 4,208,157
[45] Jun. 17, 1980

[54] SNAP-ON INDICATOR HOLDER KIT

[76] Inventors: Rocco M. Guarino; Lottie G. Guarino, both of 7648 Sunset Dr., Elmwood Park, Ill. 60635

[21] Appl. No.: 880,418

[22] Filed: Feb. 23, 1978

Related U.S. Application Data

[63] Continuation-in-part of Ser. No. 597,318, Jul. 21, 1975, abandoned.

[51] Int. Cl.² .............................................. G01B 3/22
[52] U.S. Cl. ................................. 409/218; 33/172 D; 248/DIG. 4; 248/226.5
[58] Field of Search .............. 248/DIG. 4, 230, 226.5, 248/231; 33/169 C, 185 R, 172 D; 408/16; 90/DIG. 12, 11 E

[56]   References Cited
U.S. PATENT DOCUMENTS

| | | | |
|---|---|---|---|
| 1,391,731 | 9/1921 | Genung | 33/172 D |
| 1,994,497 | 3/1935 | Winters | 33/172 D |
| 2,177,921 | 10/1939 | Zofrey | 248/DIG. 4 |
| 2,287,890 | 6/1942 | Legassey | 248/DIG. 4 |
| 2,528,201 | 10/1950 | White | 248/DIG. 4 |
| 2,533,198 | 12/1950 | Radtke | 33/172 D |
| 2,721,390 | 10/1955 | Pasturczak | 248/DIG. 4 |
| 3,194,526 | 7/1965 | Lemmond | 248/226.5 |
| 3,432,932 | 3/1969 | Oellerich et al. | 33/172 D |
| 3,442,478 | 5/1969 | Parapetti | 33/172 D X |
| 3,807,675 | 4/1974 | Seckerson | 248/226.5 X |

Primary Examiner—Horace M. Culver
Attorney, Agent, or Firm—Bernard L. Kleinke

[57] ABSTRACT

Snap-on holders adapted to be attached to a head portion of a machine for supporting an indicator include a body member composed of a stiff resilient plastic material and having a pair of spaced-apart prongs adapted to spread apart and to snap into snug-gripping engagement with the head portion of the machine to be supported by and to extend therefrom. The prongs of the body member have a generally semi-circular arcuate surface extending for more than 180° to contact the head portion of the machine through a continuous line of engagement. The body member has a portion extending laterally from the prongs, and an aperture therein is adapted to receive rotatably therein for supporting purposes the indicator. A second snap-on holder is received in snug-gripping engagement with the prongs and is held in place by the head portion of the machine. A first elongated rigid member is rotatably and detachably mounted at one of its ends to the aperture in the body portion, and a block having a pair of first and second openings therein receives the other end of the rigid member. A second elongated rigid member is rotatably and detachably mounted at one of its ends in the other opening in the block, and a second block is connected to the opposite end of the second elongated rigid member for connecting releasably to the indicator.

7 Claims, 8 Drawing Figures

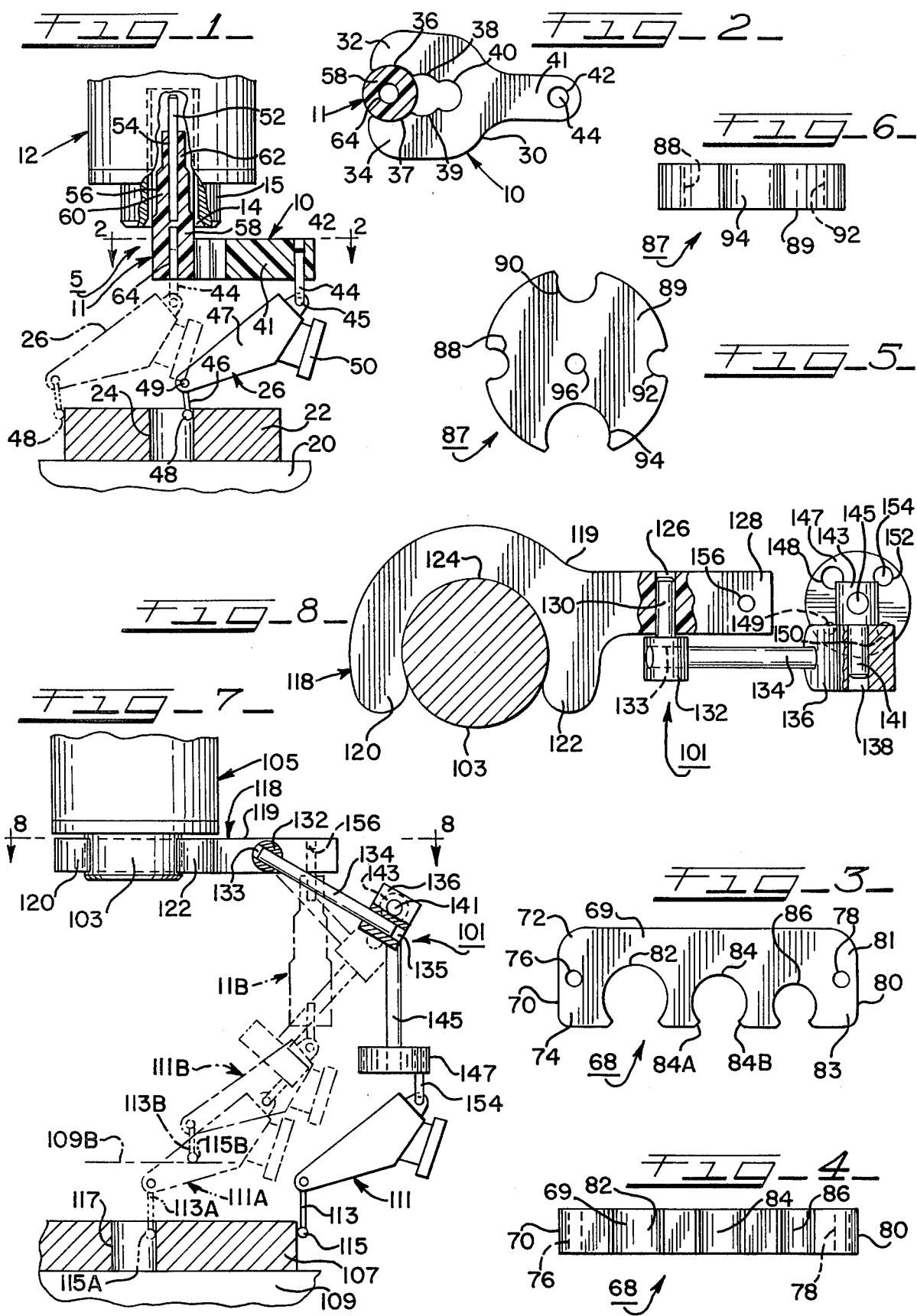

SNAP-ON INDICATOR HOLDER KIT

CROSS REFERENCES TO RELATED APPLICATIONS

The present application is a continuation-in-part application of our co-pending application, Ser. No. 597,318, filed July 21, 1975, now abandoned.

BRIEF SUMMARY OF THE INVENTION

The present invention relates in general to holders for indicators and more particularly relates to holders adapted to attach releasably to a head portion of a machine, such as a milling machine, for supporting a test indicator therefrom to help align a workpiece supported by a table portion of a machine with the head portion thereof.

For the purpose of aligning the head portion of a machine, such as vertical milling machines, grinding machines and boring machines, with a desired portion of a workpiece resting on the table portion of the machine or with the table portion itself, there have been different types and kinds of holders employed for attaching to the machine to support in turn a test indicator which cooperates with the workpiece or the table itself for aligning purposes. In some instances, the holders have attached releasably to the tool mounted in the head of the machine, and in other instances, prior art devices have attached to the head portion, such as the machine quill. For example, reference may be made to the following U.S. Pat. Nos.: 3,032,309; 3,336,677; 3,442,478; 3,750,618 and 3,823,484. While the prior known holders have been satisfactory for some applications, it would be highly desirable to have an indicator holder which is adapted to attach to a machine in a rapid and convenient manner. In this regard, prior known holders have been attached to machines by means of pressure screws, and some of the holders have articulated linkages which are positionally adjustable and which are releasably fixed in adjusted positions by means of pressure screws, whereby the use of such pressure screws is a tedious, time-consuming operation, and thus valuable set-up time is wasted by using such devices. Moreover, it would be desirable to have a new and improved holder which is relatively less expensive to manufacture and more convenient to use. Such a new and improved holder should be flexible to use in that there are many different types and kinds of machines and set-ups which require the use of a holder for a test indicator.

Therefore, it is the principal object of the present invention to provide a new and improved indicator holder kit which can be readily and conveniently attached to a machine in a very rapid manner, and which is relatively inexpensive to manufacture.

Another object of the present invention is to provide such a new and improved indicator holder kit which is very flexible in use so as to accommodate various different types and kinds of machines and set-ups therefor.

Briefly, the above and further objects of the present invention are realized by providing a holder having a body member composed of a stiff, resilient material. The body member has a pair of spaced-apart prongs adapted to be spread apart and to snap into gripping engagement with the head portion of the machine or other convenient supporting surface to be supported by and to extend therefrom. The prongs of the body member have a generally semi-circular arcuate surface extending for more than 180° to contact the supporting surface through a continuous line of engagement of more than 180°. The body member has a portion extending laterally from the prongs and having an aperature therein adapted to receive rotatably therein for supporting purposes the indicator. A second snap-on holder is adapted to be received in snug-gripping engagement by the prongs, the second holder being generally cylindrical in shape and having an end portion in a plurality of graduated reduced diameter portions adapted to be held by the head portion of a machine. A first elongated rigid member is rotatably and detachably mounted at one of its ends in the aperature of the body member, and a first block has a pair of spaced-apart openings extending in transverse directions to one another so that one of the openings rotatably and detachably receives the opposite end of the rigid member. A second elongated rigid member is rotatably and detachably mounted at one of its ends in the other opening in the first block. A second block is connected to the opposite end of the second elongated member for connecting releasably to the indicator. In this manner, various different holders and parts thereof may be snapped together to form a support for a test indicator to accommodate a given machine set-up arrangement. In this manner, various different set-up arrangements may be accommodated, and different sizes and kinds of machines and tools, as well as workpieces, may be accommodated. Moreover, the holder kit of the present invention can be quickly snapped into engagement with the machine or its tool for a very fast test set-up procedure. Also, by employing the holder kit of the present invention, an articulated support structure is formed, and a given position can be assumed by the articulated structure without the necessity of tediously tightening and subsequently loosening pressure screws. Moreover, the holder kit of the present invention is relatively inexpensive to manufacture.

BRIEF DESCRIPTION OF DRAWINGS

Other objects and advantages of the present invention will become apparent to those skilled in the art when considered in connection with the accompanying drawings, wherein:

FIG. 1 is a cross-sectional fragmentary elevational view of a snap together indicator holder kit, which is constructed in accordance with the present invention, and which is illustrated attached to a machine, such as a milling machine;

FIG. 2 is a cross-sectional view of the kit of FIG. 1 taken substantially along the line 2—2 thereof;

FIG. 3 is a plan view of an indicator holder which is constructed in accordance with the present invention and which may be employed with the kit of FIG. 1 of the drawings;

FIG. 4 is a front elevational view of the indicator holder of FIG. 3;

FIG. 5 is a plan view of another indicator holder, which is constructed in accordance with the present invention and which may be used with the holder kit of FIG. 1 of the drawings;

FIG. 6 is a front elevational view of the holder of FIG. 5;

FIG. 7 is a front elevational view of a snap-on indicator holder kit, which is constructed in accordance with the present invention and which may have interchangeable parts with the kit of FIG. 1 of the drawings; and FIG. 8 is a cross-sectional view of the kit of FIG. 7 taken along the line 8—8 thereof.

DETAILED DESCRIPTION

Referring now to the drawings, and more particularly to FIGS. 1 and 2 thereof, there is shown a snap-on indicator holder kit 5, which is constructed in accordance with the present invention, and which generally comprises an indicator holder 10 and another indicator holder 11 which attach to a millhead generally indicated at 12 having a collet 14 mounted within a cylindrically shaped quill 15 for supporting a cutting tool (not shown) above a support table 20. A workpiece 22 supported on top of the table 20 has a hole 24 into which a cutting tool (not shown) is to be guided by the millhead 12 for boring purposes. A test indicator 26 is attached to the holder kit 5 in such a position as to engage the workpiece 22 at the hole 24 for the purpose of enabling the center line of the hole 24 to be checked for concentricity relative to the center line of the quill 15. Such a test indicator is made in Switzerland and sold in the United States under the name "INTERAPID" test indicators. In this regard, the kit 5 is rotated with the spindle of the milling machine in a slow hand movement through 360° so that the side of the hole 24 is contacted by the indicator 26.

Considering now the holder 10 in greater detail with reference to the drawings, the holder 10 is also shown in FIGS. 1 and 2 of the foregoing mentioned co-pending application, and generally comprises a body portion 30, which is composed of a stiff semi-rigid resilient plastic material, such as rubber, neoprene, teflon, nylon or the like, but it is preferred to employ urethane material. The body portion 30 has a pair of spaced-apart prongs adapted to spread apart and to snap into snug-gripping engagement with the quill 15 of the machine or other convenient supporting surface such as the holder 11 as illustrated in the drawings, so that the body portion 30 of the holder 10 is supported by and extends from the supporting surface. In this regard, the holders 10 and 11 may be snapped out of engagement with one another and, if desired, only the holder 10 may be employed by snapping it into engagement with the shank of a cutting tool (not shown) as described and shown in the foregoing-mentioned co-pending application.

A generally semi-circular pair of complimentary arcuate surfaces 36 and 37 of the respective prongs 32 and 34 are adapted to engage in a continuous line of snug-gripping engagement with the outer surface of the quill 15. A pair of semi-circular complimentary arcuate surfaces 38 and 39 are continuous with the respective surfaces 36 and 37 of the respective prongs 32 and 34 for engaging a smaller diameter supporting surface, such as the shank of a smaller cutting tool. A semi-circular arcuate surface 40 is continuous with the arcuate surfaces 38 and 39 to snap into engagement with a smaller-sized shank of a cutting tool (not shown). Therefore, the prongs 32 and 34 of the body portion 30 include a pair of complimentary generally semi-circular arcuate spaced-apart confronting surfaces 38 and 39 adapted to snap into a pair of continuous lines of snug-gripping engagement with intermediate-sized diameter portion of another machine or a shank portion of a cutting tool (not shown). The surfaces 38 and 39 form continuations of the arcuate surface 40, and each one of the surfaces 38 and 39 extend for less than 180°, the surface 40 extending for slightly greater than 180°. Similarly, the surfaces 36 and 37 form continuations of the respective surfaces 38 and 39, and they extend for less than 180°. The surfaces 36 and 37 are generally semi-circular arcuate spaced-apart confronting surfaces adapted to snap into a pair of continuous lines of snug-fitting engagement with a still larger diameter portion of another machine or a larger shank portion of a cutting tool (not shown). A tail portion 41 of the body portion 40 has a hole 42 disposed therein for receiving in a friction-tight manner a stem or support pin 44 pivotally attached at 45 to a housing 47 of the test indicator 26. In this regard, it should be noted that the support pin 44 is able to be slid into the hole 42 by the user and due to the snug fit within the hole 42, the indicator 26 hangs from the tail portion 41, as shown in FIG. 1 of the drawings. Also, due to the smooth inner surface of the hole 42 and to the plastic material of the body portion 30, the support pin 44 can be rotated about its vertical axis to adjust positionally the indicator 26. In order to remove the support pin 44 from the hole 42, the indicator 26 is rotated back and forth about the vertical axis of the support pin 44 while pulling the indicator 26 away from the hole 42.

In the position as shown in FIG. 1 of the drawings, a lever feeler or contact point 46 having an enlarged distal end or sensor 48 of the indicator 26 is pivotally attached to the housing 47 at 49. A dial head or face 50 provides an indication to the user of the relative position of the feeler contact 46 relative to the housing 47.

It should be noted that the holders 10 and 11 may be snapped apart and, if desired, the holder 11 may be used in the collet 14 to support the indicator 26 in the broken line position as shown in the drawings, whereby the feeler contact 48 can engage the side surface of the workpiece 22.

Considering now the holder 11 in greater detail with reference to the drawings, the holder 11 has been shown and described in the foregoing-mentioned co-pending patent application and generally comprises a metal pin or rod 52 disposed within a hole or bore 54 of a plastic elongated generally cylindrical body portion 56 having an enlarged front end portion 58 disposed within and gripped by the collet 14 to support the entire kit 5 from the machine head 12. An intermediate-diameter portion 60 of the body portion 56 is disposed axially to the rear of the enlarged front end portion 58 so that the holder 11 can fit conveniently within a smaller-sized collet opening. Similarly, a reduced diameter portion 52 of the body portion 56 disposed axially to the rear of the intermediate portion 60 enables the holder 11 to fit within a smaller-sized collet opening. The rod 52 extends rearwardly from the reduced diameter portion 62 and serves the purpose of enabling the holder 11 to fit within an even smaller-sized collet opening. The pin 52 also serves to reinforce the body portion 56.

A bore or opening is axially aligned with the body portion 56 and is disposed in the enlarged front end portion 58 to receive the support pin 44 of the indicator 26, as indicated in the phantom lines shown in FIG. 1 of the drawings.

Referring now to FIGS. 3 and 4 of the drawings, there is shown an indicator holder 68, which is also constructed in accordance with the present invention and which may be used in place of the holder 10 of FIG. 1 of the drawings. The holder 68 is shown in FIG. 4 of the drawings in our co-pending patent application and is described therein. The indicator holder 68 is composed of the same material as the holder 10 and generally comprises a body portion 69 having a left end 70 with rounded corners 72 and 74.

A hole 76 in the body portion 69 is adapted to receive the support pin of the indicator in the same manner as the hole 42 serves to receive the support end 44. Similarly, at the other end of the elongated body portion 69, there is disposed a similar hole 78 which is also adapted to receive a support pin indicator. Near the hole 78, is the rounded end 80 having a pair of rounded corners 81 and 83. Intermediate the ends of the body portion 69 are a series of graduated size semi-circular open holes 82, 84 and 86. Each one of the open holes, such as the intermediate open hole 84, includes a generally semi-circular arcuate surface extending for more than 180° to contact the supporting surface through a continuous line of engagement of more than 180°, and it has a pair of camming surfaces 84A and 84B to enable the holder 68 to be readily moved into snapping engagement with the supporting surface.

Referring now to FIG. 5 of the drawings, there is shown another holder 87, which is constructed in accordance with the present invention and which may be used in place of the holder 10 of FIG. 1 of the drawing. The holder 87 includes a disc body portion 89 which is composed of the same material as a holder 10. The disc body portion 89 has a series of graduated-sized holes 88, 90, 92, and 94 spaced equally about the peripheral of the disc 89, and each one of the holes is generally semi-circular with an arcuate surface extending for more than 180° to contact various different sizes of supporting surfaces through a continuous line of engagement of more than 180°.

Referring now to FIGS. 7 and 8 of the drawings, there is shown another snap together indicator holder kit 101 which is constructed in accordance with the present invention and which is detachably mounted to the spindle 103 of a millhead 105 of a milling machine (not shown). It should be understood that, while a portion of a milling machine is shown, the indicator holder kits of the present invention may be used with other different types of machines as will become apparent to those skilled in the art. A workpiece 107 supported by a table portion 109 of the milling machine is disposed directly below the millhead 105, and a test indicator 111 is releasably connected to the indicator holder kit 101 in the position as shown in solid lines in FIG. 7 of the drawings to engage the side surface of the workpiece 107 in a similar manner as shown in phantom lines in FIG. 1 of the drawings. In this regard, a lever or feeler contact 113 having an enlarged distal end or sensor 115 engages the side surface of the workpiece 107 or alternatively the feeler contact may engage the inside surface of a hole 117 in the workpiece 107 as shown in the phantom lines with the reference characters including the letter A, in a similar manner as shown in solid lines of FIG. 1 of the drawings.

The indicator holder kit 101 is an articulated holder kit to assume various different positions. It should be understood that the kit 101 may be used separately from the kit 5 of FIG. 1 of the drawings or the parts of all of the kits shown in the drawings as well as the various different holders may be employed in one large kit, since the parts are all interchangeable and may be used in various different combinations to facilitate different set-up arrangements.

The kit 101 includes an indicator holder 118 which is somewhat similar to the holder 10 of FIG. 1 of the drawings and which generally comprises a body portion 119 which is composed of the same type of material as the holder 10 of FIG. 1 of the drawings. The body portion 119 includes a pair of spaced-apart prongs adapted to spread apart and to snap into snug-gripping engagement with the outer cylindrical surface of the spindle 103. The prongs have a generally semi-circular arcuate surface 124 extending for more than 180° to contact the supporting surface through a continuous line of engagement of more than 180°. A hole 126 extending through a tail portion 128 in a direction extending in the plane of the prong 120 and 122 receives in a friction-tight pivotal manner a pivot pin 130 fixed to and projecting from a block 132. The pivot pin and the block 132 are composed of metal material so as to enable the block to rotate about the axis of the pivot pin 130 within the hole 126. A hole 133 and the block 132 receives in a rigid friction-tight manner the end portion of a metal rod 134 so that the rod 134 and the block 132 are fixed rigidly together. A hole 135 in a block 136 receives in a friction-tight rotatable manner the opposite end of the rod 134. For this purpose, the block 136 is composed of the same type of plastic material as the body portion 119 of the holder 118. In this regard, the metal rod 134 can be rotated about its axis within the hole 135, and the rod 134 can be regularly adjusted relative to the block 136, whereby the rod 134 can remain in its adjusted position in a rigid manner as shown in FIG. 7 of the drawings and yet be adjusted easily rotatably.

As shown in FIG. 8 of the drawings, a hole 138 extends in a spaced-apart transverse manner relative to the hole 135 to receive a metal pivot pin 141 projecting from and rigidly connected to a metal block 143. A rod 145 has its upper end fixed within an opening in the metal block 143 for rigidly connecting them together. A disc 147 composed of the same material as the block 136 has a series of graduated-sized circular holes 148, 149, 150 and 152 for receiving selectively a stem or support pin 154 of the indicator 111. In this regard, various different-sized indicators stems may be received. Thus, the kit 101 can assume various different adjusted positions by merely moving them, and they will remain in the adjusted position without the necessity of pressure screws. A hole 156 in the tail portion 128 extends in a spaced-apart manner relative to the hole 126 in a transverse direction to receive the pin 52 of the holder 11 of FIG. 1 as indicated in the phantom lines shown in FIG. 7 with the reference characters using the letter B so as to have the indicator contact the upper surface of the table 109. Thus, it should now become apparent to those skilled in the art that the indicator holder kit of the present invention is very versatile in that it employs various different interchangeable parts which can be conveniently snapped together to be used in many different combinations to accommodate various different machines and machine set-up arrangements.

The embodiments of the invention in which an exclusive property or priviledge is claimed are defined as follows:

1. In a snap-on holder kit adapted to be attached to a head portion of a machine for supporting an indicator, an arrangement comprising:
   a holder having a body member being composed of stiff resilient material, said body member having a pair of spaced-apart prongs adapted to spread apart and to snap into snug gripping engagement with the head portion of the machine or other convenient supporting surface to be supported by and to extend therefrom, said prongs of said body member having means defining a generally semi-circular arcuate surface extending for more than 180° to contact the supporting surface through a continuous line of engagement of more than 180°, said body member having a portion extending laterally from said prongs, said portion having means defining an aperture therein adapted to receive rotatably therein for supporting purposes the indicator, wherein said prongs of said body member further include means defining a pair of complementary second and third generally semi-circular arcuate spaced-apart confronting surfaces adapted to snap into a pair of continuous lines of snug-gripping engagement with a larger diameter portion of another machine, said second and third surfaces forming continuations of the first-mentioned surface, each one of said second and third surfaces extending for less than 180°.

2. In a snap-on holder kit, an arrangement according to claim 1, wherein the head portion includes gripping means, further including a second snap-on holder being received in snug gripping engagement by said prongs, said second holder being generally cylindrical in shape and having an end portion and a plurality of graduated reduced diameter portions adapted to be held by said gripping means of said head portion.

3. In a snap-on holder kit, an arrangement according to claim 2, wherein said second holder includes an axially extending opening receiving and supporting the indicator.

4. In a snap-on holder kit, an arrangement according to claim 2, wherein said second holder includes a plastic body portion having a metal pin extending axially therefrom for rigidifying its body portion and held by said gripping means.

5. In a snap-on holder kit, an arrangement according to claim 1, wherein said prongs of said body member further including means defining a pair of complementary fourth and fifth generally semi-circular arcuate spaced-apart confronting surfaces adapted to snap into a pair of continuous lines of snug-gripping engagement with a still larger diameter portion of yet another machine, said fourth and fifth surfaces forming continuations of the respective ones of said second and third surfaces, each one of said fourth and fifth surfaces extending for less than 180°.

6. In a snap-on holder kit adapted to be attached to a head portion of a machine for supporting an indicator, an arrangement comprising:

a holder having a body member being composed of stiff resilient material, said body member having a pair of spaced-apart prongs adapted to spread apart and to snap into snug gripping engagement with the head portion of the machine or other convenient supporting surface to be supported by and to extend therefrom, said prongs of said body member having means defining a generally semi-circular arcuate surface extending for more than 180° to contact the supporting surface through a continuous line of engagement of more than 180°, said body member having a portion extending laterally from said prongs, said portion having means defining an aperture therein adapted to receive rotatably therein for supporting purposes the indicator, further including a first elongated rigid member rotatably and detachably mounted at one of its ends in said aperture, a block being disposed at the opposite ends of said rigid member and having means defining a pair of first and second spaced-apart openings extending in transverse directions to one another, said first opening rotatably and detachably receiving the opposite end of said rigid member, a second elongated rigid member being rotatably and detachably mounted at one of its ends in said second opening in said block, means being connected to the opposite end of said second elongated rigid member connecting releasably to the indicator, wherein the last-mentioned means includes a second block having a first aperture therein receiving rotatably in a friction tight manner the opposite end of said first elongated rigid member, said last-mentioned means further including a plurality of different sized apertures therein receiving individually and selectively in a friction-tight axially rotatable manner a support pin of the indicator.

7. In a snap-on holder kit, an arrangement according to claim 6, further including a plurality of different size pair of said prongs.

* * * * *